United States Patent
Lu et al.

(10) Patent No.: US 10,479,887 B2
(45) Date of Patent: Nov. 19, 2019

(54) BIODEGRADABLE POLYESTER COMPOSITION

(71) Applicants: Kingfa Sci. & Tech. Co., Ltd., Guangzhou, Guangdong (CN); Zhuhai Wango Chemical Co., Ltd., Zhuhai, Guangdong (CN)

(72) Inventors: Changli Lu, Guangdong (CN); Zhimin Yuan, Guangdong (CN); Tongmin Cai, Guangdong (CN); Xianbo Huang, Guangdong (CN); Xiangbin Zeng, Guangdong (CN); Jian Jiao, Guangdong (CN); Renxu Yuan, Guangdong (CN); Yuke Zhong, Guangdong (CN); Kai Xiong, Guangdong (CN); Hui Yang, Guangdong (CN); Kaijin Mai, Guangdong (CN); Xueteng Dong, Guangdong (CN)

(73) Assignees: Kingfa Sci. & Tech. Co., Ltd. (CN); Zhuhai Wango Chemical Co., Ltd. (CN)

(*) Notice: Subject to any disclaimer, the term of this patent is extended or adjusted under 35 U.S.C. 154(b) by 0 days.

(21) Appl. No.: 15/580,217

(22) PCT Filed: Mar. 1, 2017

(86) PCT No.: PCT/CN2017/075358
§ 371 (c)(1),
(2) Date: Dec. 6, 2017

(87) PCT Pub. No.: WO2018/014561
PCT Pub. Date: Jan. 25, 2018

(65) Prior Publication Data
US 2018/0298188 A1    Oct. 18, 2018

(30) Foreign Application Priority Data

Jul. 22, 2016  (CN) .......................... 2016 1 0583508

(51) Int. Cl.
*C08L 67/02*    (2006.01)
*C08K 13/02*    (2006.01)
*C08G 63/183*   (2006.01)

(52) U.S. Cl.
CPC ............ *C08L 67/02* (2013.01); *C08G 63/183* (2013.01); *C08K 13/02* (2013.01); *C08G 2230/00* (2013.01); *C08L 2201/06* (2013.01); *C08L 2201/08* (2013.01); *C08L 2205/025* (2013.01); *C08L 2205/03* (2013.01)

(58) Field of Classification Search
CPC ........................................................ C08L 67/02
See application file for complete search history.

(56) References Cited

U.S. PATENT DOCUMENTS

| 2003/0187149 A1* | 10/2003 | Schmidt ................. C08L 67/02 |
|---|---|---|
| | | 525/418 |
| 2012/0316257 A1* | 12/2012 | Bastioli ................. C08G 63/16 |
| | | 521/182 |
| 2013/0147087 A1* | 6/2013 | Huang .................... A46D 1/00 |
| | | 264/178 R |

FOREIGN PATENT DOCUMENTS

| CN | 102639594 A | 8/2012 |
|---|---|---|
| CN | 102712766 A | 10/2012 |
| CN | 103687902 A | 3/2014 |
| CN | 104479304 A | 4/2015 |
| CN | 104744898 A | 7/2015 |
| CN | 106084682 A | 11/2016 |

OTHER PUBLICATIONS

International Search Report for Application No. PCT/CN2017/075358 dated Jun. 12, 2017.

* cited by examiner

*Primary Examiner* — Michael F Pepitone
(74) *Attorney, Agent, or Firm* — Lerner, David, Littenberg, Krumholz & Mentlik, LLP

(57) ABSTRACT

The present invention discloses a biodegradable polyester composition, wherein based on a total weight of the biodegradable polyester composition, a weight content of glycidyl methacrylate is 0.05 ppm-10 ppm. In the present invention, by adding a trace amount of glycidyl methacrylate into a chosen formula of the biodegradable polyester composition and controlling the weight content of glycidyl methacrylate which finally remains in the biodegradable polyester composition as 0.05 ppm-10 ppm, a compatibility between aliphatic-aromatic polyester and polylactic acid in the biodegradable polyester composition can be greatly enhanced, which enables the biodegradable polyester composition to have excellent surface property of film material, and no fisheye occurs on the film material because of a fluctuation of processing technique.

18 Claims, No Drawings

BIODEGRADABLE POLYESTER COMPOSITION

CROSS REFERENCE TO RELATED APPLICATIONS

The present application is a national phase entry under 35 U.S.C. § 371 of International Application No. PCT/CN2017/075358, filed Mar. 1, 2017, which claims priority from Chinese Patent Application No. 201610583508.8 filed Jul. 22, 2016, all of which are hereby incorporated herein by reference.

TECHNICAL FIELD

The present invention belongs to a field of modification of macromolecule material, and specifically relates to a biodegradable polyester composition with an excellent surface property of film material.

BACKGROUND

Biodegradable polyester is a kind of macromolecule material using biological resources as raw materials. With respect to a petroleum-based polymer using petrochemical resources as raw materials, the biodegradable polyester can be degraded during a process of biological or biochemical effect or in a biological environment, being a very active degradable material in the present biodegradable plastic research and one of the best degradable materials in market application.

The biodegradable polyester of which substrate is aliphatic-aromatic polyester and polylactic acid, usually causes phenomenons such as broken holes and white stripes, on a surface of film material during film blow molding, which affects a surface appearance property of film material, owing to a relatively poor compatibility between aliphatic-aromatic polyester and polylactic acid. In order to improve the compatibility of those two, a conventional method is to add a copolymer which contains epoxy group and is based on styrene, acrylate and/or methacrylate, or to add a chain extender such as diisocyanate (CN103687902A, CN 102712766 B). Addition of a suitable amount of the chain extender improves the compatibility between aliphatic-aromatic polyester and polylactic acid to great extent and optimizes a surface property of film material. However, owing to fluctuations of factors such as an additive amount of the chain extender and a processing temperature, a chain extension reaction will tend to cause phenomenons such as insufficient chain extension or excessive chain extension, resulting in a plastic point (a fisheye) which is difficult to be plasticized on the surface of film material. This brings up a high demand on a modification technology and a processing technology and is difficult to satisfy a continuous production in large scale.

The present invention surprisingly finds by research that by adding a trace amount of glycidyl methacrylate into a chosen formula of the biodegradable polyester composition and controlling a weight content of glycidyl methacrylate which finally remains in the biodegradable polyester composition as 0.05 ppm-10 ppm, the compatibility between aliphatic-aromatic polyester and polylactic acid in the biodegradable polyester composition can be greatly enhanced, which enables the biodegradable polyester composition to have excellent surface property of film material, and no fisheye occurs on the film material because of the fluctuation of processing technique.

SUMMARY OF THE INVENTION

An objective of the present invention is to provide a biodegradable polyester composition. By adding a trace amount of glycidyl methacrylate into the composition, the prepared biodegradable polyester composition is enabled to have an excellent surface property of film material, and no fisheye occurs on the film material because of a fluctuation of processing technique.

The above objective of the present invention is realized by following technical solution:

a biodegradable polyester composition comprises following components in parts by weight:

i) 60 to 100 parts of biodegradable aliphatic-aromatic polyester;
ii) 0 to 40 parts of polylactic acid;
iii) 0 to 35 parts of an organic filler and/or an inorganic filler.

Preferably, the biodegradable polyester composition according to the present invention comprises following components in parts by weight:

i) 65 to 95 parts of the biodegradable aliphatic-aromatic polyester;
ii) 5 to 35 parts of the polylactic acid;
iii) 5 to 25 parts of the organic filler and/or the inorganic filler.

Particularly, a MFR of the component i) is tested as 2 g/10 min-30 g/10 min under a condition of 190° C. and 2.16 kg according to ISO 1133; and a MFR of the component ii) is tested as 3 g/10 min-40 g/10 min under the condition of 190° C. and 2.16 kg according to ISO 1133.

Preferably, the MFR of the component i) is tested as 5 g/10 min-15 g/10 min under the condition of 190° C. and 2.16 kg according to ISO 1133; and the MFR of the component ii) is tested as 5 g/10 min-20 g/10 min under the condition of 190° C. and 2.16 kg according to ISO 1133.

In particular, based on a total weight of the biodegradable polyester composition, a weight content of glycidyl methacrylate is 0.05 ppm-10 ppm, preferably 0.5 ppm-8 ppm, and more preferably 2 ppm-5 ppm. The weight content of glycidyl methacrylate means the weight content of those finally remaining in the biodegradable polyester composition.

The weight content of glycidyl methacrylate according to the present invention is measured by following method: 1.2000 g±0.005 g of the biodegradable polyester composition is weighed accurately and added into a static headspace test flask; a peak area of glycidyl methacrylate in the biodegradable polyester composition is measured by a static headspace method; the weight content of glycidyl methacrylate in the biodegradable polyester composition can be calculated according to the peak area of glycidyl methacrylate in the biodegradable polyester composition and a standard curve of glycidyl methacrylate; and the standard curve of glycidyl methacrylate is calibrated by a solution of glycidyl methacrylate/methanol.

Glycidyl methacrylate is a substance with an active functional group. Suitable weight content of glycidyl methacrylate which is added into the biodegradable polyester composition plays a compatibilization and enhances a compatibility of substances in two or more phases in the biodegradable polyester composition so as to improve the surface property of film material in the biodegradable polyester composition. However, if an additive amount of glycidyl methacrylate is too high, the composition will over crosslink, resulting in that there are relatively more fisheyes on the surface of film material which is blow molded by the biodegradable polyester composition, and the film material is easily bored a hole. If the additive amount of glycidyl methacrylate is too low, a dispersibility of substances in two or more phases in the biodegradable polyester composition is poor and an interface bonding force is weak, similarly resulting in phenomenons such as holes on the surface of film material and an uneven surface. The present invention surprisingly finds by research that by adding a trace amount of glycidyl methacrylate into a formula of the biodegradable polyester composition and controlling the weight content of glycidyl methacrylate as which finally remains in the biodegradable polyester composition 0.05 ppm-10 ppm, the compatibility between aliphatic-aromatic polyester and polylactic acid can be greatly enhanced, the surface property of film material is optimized and there is no fisheye that occurs on the film material because of the fluctuation of processing technique. Based on the total weight of the biodegradable polyester composition, the weight content of glycidyl methacrylate is preferably 0.5 ppm-8 ppm, and more preferably 2 ppm-5 ppm.

A route of acquiring glycidyl methacrylate in the present invention is to add glycidyl methacrylate directly during blending and processing the biodegradable polyester composition, so as to adjust the weight content of glycidyl methacrylate that finally remains in the biodegradable polyester composition.

Particularly, the biodegradable aliphatic-aromatic polyester is selected from one or more of poly (butyleneadipate-co-terephthalate) (PBAT), poly (butylenesuccinate-co-terephthalate) (PBST) and poly (butylenesebacate-co-terephthalate) (PBSeT).

Particularly, the organic filler is selected from one or more of natural starch, plasticized starch, modified starch, natural fiber and wood flour; and the inorganic filler is selected from one or more of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber.

According to different needs of use, the biodegradable polyester composition according to the present invention can further comprises 0 to 4 parts of at least one of following substances: plasticizer, release agent, surfactant, wax, antistatic agent, pigment, UV absorbent, UV stabilizer and other plastic additives.

The plasticizer is one of or a mixture of two or more of citric esters, glycerol, epoxidized soybean oil, and a mixture of glycerol and water.

The release agent is one of or a mixture of two or more of silicone oil, paraffin, white mineral oil and Vaseline.

The surfactant is one of or a mixture of two or more of polysorbate, palmitate and laurate.

The wax is one of or a mixture of two or more of erucamide, stearamide, behenamide, beeswax and beeswax ester.

The antistatic agent is a permanent antistatic agent, specifically listed as one of or a mixture of two or more of PELESTAT-230, PELESTAT-6500 and SUNNICO ASA-2500.

The pigment is one of or a mixture of two or more of carbon black, black masterbatch, titanium dioxide, zinc sulfide, phthalocyanine blue and fluorescent orange.

The UV adsorbent is one or more of UV-944, UV-234, UV531 and UV326.

The UV stabilizer is one or more of UV-123, UV-3896 and UV-328.

The other plastic additives can be nucleating agent, antifogging agent, lubricant (such as calcium stearate) and the like.

The biodegradable polyester composition according to the present invention can be used for preparing shopping bag, compost bag, mulching film, protective cover film, silo film, film strip, fabric, non-fabric, textile, fishing net, bearing bag, garbage bag and the like.

Compared to the prior art, the present invention has following beneficial effects:

In the present invention, by adding a trace amount of glycidyl methacrylate into the formula of the biodegradable polyester composition and controlling the weight content of glycidyl methacrylate which finally remains in the biodegradable polyester composition as 0.05ppm-10 ppm, the compatibility between substrates, aliphatic-aromatic polyester and polylactic acid in the biodegradable polyester composition can be greatly enhanced, which enables the biodegradable polyester composition to have excellent surface property of film material, and no fisheye occurs on the film material because of the fluctuation of processing technique.

DETAILED DESCRIPTION OF THE PREFERRED EMBODIMENT

The present invention will be further described below by way of specific implementations, and the following embodiments are preferred embodiments of the present invention, but the implementations of the present invention are not limited by the following embodiments.

The embodiments of the present invention employed following raw materials but were not limited to these raw materials:

aliphatic-aromatic polyester:

PBAT-1, MFR is 6.0 g/10 min-12.6 g/10 min, Kingfa Science and Technology Co., Ltd. as manufacturer;

PBAT-2, MFR is 20.4 g/10 min-25.2 g/10 min, Kingfa Science and Technology Co., Ltd. as manufacturer;

PBAT-3, MFR is 36.0 g/10 min-37.2 g/10 min, Kingfa Science and Technology Co., Ltd. as manufacturer;

PBST, MFR is 6.0 g/10 min-12.6 g/10 min, Kingfa Science and Technology Co., Ltd. as manufacturer;

PBSeT, MFR is 6.0 g/10 min-12.6 g/10 min, Kingfa Science and Technology Co., Ltd. as manufacturer;

polylactic acid:

PLA-1, MFR is 5.4 g/10 min-9.6 g/10 min, NatureWorks LLC as manufacturer;

PLA-2, MFR is 3.0 g/10 min-4.2 g/10 min, NatureWorks LLC as manufacturer;

PLA-3, MFR is 45.6 g/10 min-47.4 g/10 min, NatureWorks LLC as manufacturer; starch is chosen as an organic filler;

talcum powder and calcium carbonate are chosen as inorganic fillers;

palmitate and a mixture of glycerol and water are chosen as plasticizers;

calcium stearate is chosen as other plastic additive;

erucamide is chosen as a wax;

the above promoters and glycidyl methacrylate are all commercially available.

Test standard or evaluation method for each performance index:

(1) Evaluation Method for a Surface Property of Film Material of a Biodegradable Polyester Composition:

a) Calculation Method for Fisheyes on a Surface of Film Material:

A number of the fisheyes on the surface of film material was counted on a film of $1m^2$ and recorded as $N_i$; every 10 minutes, an observed film was taken for counting the number of fisheye on the surface of film material; there were 5 observed films taken totally and the numbers of fisheye on the surface of film material were recorded as $N_1$, $N_2$, $N_3$, $N_4$ and $N_5$ respectively; N, the number of fisheye on the surface of this film material was calculated according to formula (1):

$$N=(N_1+N_2+N_3+N_4+N_5)/5 \qquad \text{formula (1)};$$

The greater the N is, the more the fisheyes on the surface of film material there are and the poorer the surface appearance property of film material is.

b) Calculation Method for Broken Holes on the Surface of Film Material:

A film blowing was performed continuously for 4 hours. Broken holes occurring on the surface of film material were counted up within the 4 hours and recorded as M. The greater the M is, the severer the broken holes are and the poorer the surface appearance property of film material is.

(2) Determination Method for Glycidyl Methacrylate:

1.2000g±0.005g of the biodegradable polyester composition was weighed accurately and added into a static headspace test flask; a peak area of glycidyl methacrylate in the biodegradable polyester composition was measured by a static headspace method; a weight content of glycidyl methacrylate in the biodegradable polyester composition can be calculated according to the peak area of glycidyl methacrylate in the biodegradable polyester composition and a standard curve of glycidyl methacrylate; and the standard curve of glycidyl methacrylate was calibrated by a solution of glycidyl methacrylate/methanol.

Instrument models and parameters for static headspace are as follows:

Agilent Technologies 7697 Headspace Sampler;
Agilent Technologies 7890AGC System;
Chromatographic column: J&W 122-7032: 250° C.: 30 m×250 μm×0.25 μm
Sample injection: front SS injection port $N_2$
Sample production: front detector FID.

Embodiments 1-21 and Comparative Embodiments 1-5:

According to formulas shown in Table 1, PBAT or PBST or PBSeT, PLA, organic fillers, inorganic fillers, promoters such as plasticizer, wax and the like, and glycidyl methacrylate were mixed evenly and put into a single screw extruder. After being extruded at 140° C.-240° C. and prilled, the biodegradable polyester compositions were obtained. Data of performance tests is shown in Table 1.

TABLE 1

Component ratios (parts by weight) and test results for each performance of Embodiments 1-21 and Comparative Embodiments 1-5

| | Comparative Embodiment 1 | Comparative Embodiment 2 | Comparative Embodiment 3 | Comparative Embodiment 4 | Comparative Embodiment 5 | Embodiment 1 | Embodiment 2 | Embodiment 3 | Embodiment 4 | Embodiment 5 | Embodiment 6 |
|---|---|---|---|---|---|---|---|---|---|---|---|
| PBAT-1 | 84.4 | 84.4 | | 84.4 | | 100 | 84.4 | 84.4 | 84.4 | 67.5 | 62.8 |
| PBAT-2 | | | | | | | | | | | |
| PBAT-3 | | | 84.4 | | 84.4 | | | | | | |
| PBST | | | | | | | | | | | |
| PBSeT | | | | | | | | | | | |
| PLA-1 | 10 | 10 | 10 | | | | 10 | 10 | 10 | 32 | 15 |
| PLA-2 | | | | | | | | | | | |
| PLA-3 | | | | 10 | 10 | | | | | | |
| starch | | | | | | | | | | | 17 |
| mixture of glycerol and water | | | | | | | | | | | 5 |
| talcum powder | 1.5 | 1.5 | 1.5 | 1.5 | 1.5 | | 1.5 | 1.5 | 1.5 | | |
| calcium carbonate | 3.5 | 3.5 | 3.5 | 3.5 | 3.5 | | 3.5 | 3.5 | 3.5 | | |
| calcium stearate | 0.1 | 0.1 | 0.1 | 0.1 | 0.1 | | 0.1 | 0.1 | 0.1 | 0.2 | 0.1 |
| palmitate | | | | | | | | | | 0.3 | |
| erucamide | 0.5 | 0.5 | 0.5 | 0.5 | 0.5 | | 0.5 | 0.5 | 0.5 | | 0.1 |
| content of glycidyl methacrylate/ppm | 0 | 23 | 0.1 | 0.1 | 0.1 | 2 | 2.8 | 4.6 | 5 | 3.5 | 4.1 |
| fisheyes of film material N | 55 | 67 | 45 | 46 | 52 | 15 | 13 | 9 | 4 | 18 | 22 |
| broken holes of film material M | 89 | 72 | 56 | 50 | 72 | 16 | 15 | 11 | 4 | 18 | 21 |

| | Embodiment 7 | Embodiment 8 | Embodiment 9 | Embodiment 10 | Embodiment 11 | Embodiment 12 | Embodiment 13 | Embodiment 14 | Embodiment 15 |
|---|---|---|---|---|---|---|---|---|---|
| PBAT-1 | 84.4 | 84.4 | 84.4 | 84.4 | 84.4 | 84.4 | | 84.4 | |
| PBAT-2 | | | | | | | 84.4 | | |
| PBAT-3 | | | | | | | | | 84.4 |
| PBST | | | | | | | | | |
| PBSeT | | | | | | | | | |
| PLA-1 | 10 | 10 | 10 | 10 | 10 | 10 | 10 | | |
| PLA-2 | | | | | | | | 10 | 10 |
| PLA-3 | | | | | | | | | |
| starch | | | | | | | | | |
| mixture of glycerol and water | | | | | | | | | |

TABLE 1-continued

Component ratios (parts by weight) and test results for each performance of Embodiments 1-21 and Comparative Embodiments 1-5

| | | | | | | | | | |
|---|---|---|---|---|---|---|---|---|---|
| talcum powder | 1.5 | 1.5 | 1.5 | 1.5 | 1.5 | 1.5 | 1.5 | 1.5 | 1.5 |
| calcium carbonate | 3.5 | 3.5 | 3.5 | 3.5 | 3.5 | 3.5 | 3.5 | 3.5 | 3.5 |
| calcium stearate palmitate | 0.1 | 0.1 | 0.1 | 0.1 | 0.1 | 0.1 | 0.1 | 0.1 | 0.1 |
| erucamide | 0.5 | 0.5 | 0.5 | 0.5 | 0.5 | 0.5 | 0.5 | 0.5 | 0.5 |
| content of glycidyl methacrylate/ppm | 1.1 | 7.8 | 8 | 0.1 | 10 | 0.05 | 0.1 | 0.1 | 0.1 |
| fisheyes of film material N | 25 | 29 | 30 | 32 | 35 | 36 | 40 | 39 | 45 |
| broken holes of film material M | 27 | 27 | 25 | 36 | 39 | 40 | 41 | 39 | 43 |

| | Embodiment 16 | Embodiment 17 | Embodiment 18 | Embodiment 19 | Embodiment 20 | Embodiment 21 |
|---|---|---|---|---|---|---|
| PBAT-1 | | | | | | |
| PBAT-2 | | | | | | |
| PBAT-3 | | | | | | |
| PBST | 84.4 | 84.4 | 84.4 | | | |
| PBSeT | | | | 84.4 | 84.4 | 84.4 |
| PLA-1 | 10 | 10 | 10 | 10 | 10 | 10 |
| PLA-2 | | | | | | |
| PLA-3 | | | | | | |
| starch | | | | | | |
| mixture of glycerol and water | | | | | | |
| talcum powder | 1.5 | 1.5 | 1.5 | 1.5 | 1.5 | 1.5 |
| calcium carbonate | 3.5 | 3.5 | 3.5 | 3.5 | 3.5 | 3.5 |
| calcium stearate palmitate | 0.1 | 0.1 | 0.1 | 0.1 | 0.1 | 0.1 |
| erucamide | 0.5 | 0.5 | 0.5 | 0.5 | 0.5 | 0.5 |
| content of glycidyl methacrylate/ppm | 2.8 | 1.1 | 0.1 | 2.8 | 1.1 | 0.1 |
| fisheyes of film material N | 14 | 27 | 33 | 16 | 28 | 35 |
| broken holes of film material M | 16 | 28 | 37 | 18 | 27 | 38 |

What is claimed:

1. A biodegradable polyester composition, characterized in that, it comprises following components in parts by weight:
   i) 60 to 100 parts of biodegradable aliphatic-aromatic polyester;
   ii) 0 to 40 parts of polylactic acid;
   iii) 0 to 35 parts of an organic filler and/or an inorganic filler; and
   iv) based on a total weight of the biodegradable polyester composition, a weight content of glycidyl methacrylate is 0.05 ppm-10 ppm, for enhancing compatibility between the aliphatic-aromatic polyester and the polylactic acid to increase surface property and decrease fisheyes in the biodegradable polyester composition when processed into a film.

2. The biodegradable polyester composition according to claim 1, wherein the biodegradable polyester composition comprises following components in parts by weight:
   i) 65 to 95 parts of the biodegradable aliphatic-aromatic polyester;
   ii) 5 to 35 parts of the polylactic acid;
   iii) 5 to 25 parts of the organic filler and/or the inorganic filler.

3. The biodegradable polyester composition according to claim 1, wherein a MFR of the component i) is tested as 2 g/10 min-30g/10 min under a condition of 190° C. and 2.16 kg according to ISO 1133 ; and a MFR of the component ii) is tested as 3g/10 min-40 g/10 min under the condition of 190° C. and 2.16 kg according to ISO 1133.

4. The biodegradable polyester composition according to claim 3, wherein the MFR of the component i) is tested as 5 g/10min-15 g/10min under the condition of 190° C. and 2.16 kg according to ISO 1133 ; and the MFR of the component ii) is tested as 5 g/10 min-20 g/10 min under the condition of 190° C. and 2.16 kg according to ISO 1133.

5. The biodegradable polyester composition according to claim 1, wherein based on a total weight of the biodegradable polyester composition, the weight content of the glycidyl methacrylate is 0.5 ppm-8 ppm.

6. The biodegradable polyester composition according to claim 1, wherein the biodegradable aliphatic-aromatic polyester is selected from one or more of pol(butyleneadipate-co-terephtalate) (PBAT), poly(butylenesuccinate-co-terephthalate) (PBST) and poly(butylenesebacate-co-terephthalate) (PBSeT).

7. The biodegradable polyester composition according to claim 1, wherein the organic filler is selected from one or more of natural starch, plasticized starch, modified starch, natural fiber and wood flour; and the inorganic filler is selected from one or more of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber.

8. The biodegradable polyester composition according to claim 1, wherein it further comprises 0 to 4 parts of at least one of following substances: plasticizer, release agent, surfactant, wax, antistatic agent, pigment, UV absorbent, UV stabilizer and other plastic additives.

9. The biodegradable polyester composition according to claim 2, wherein a MFR of the component i) is tested as 2 g/1010min-30 g/10min under a condition of 190 ° C. and 2.16 kg according to ISO 1133 ; and a MFR of the component ii) is tested as 3 g/10 min-40g/10 min under the condition of 190 ° C. and 2.16 kg according to ISO 1133.

10. The biodegradable polyester composition according to claim 9, wherein the MFR of the component i) is tested as 5g/10min-15g/10 min under the condition of 190 ° C. and 2.16 kg according to ISO 1133 ; and the MFR of the component ii) is tested as 5g/10 min-20 g/10 min under the condition of 190 ° C. and 2.16 kg according to ISO 1133.

11. The biodegradable polyester composition according to claim 2, wherein based on a total weight of the biodegradable polyester composition, the weight content of glycidyl methacrylate is 0.5 ppm-8 ppm.

12. The biodegradable polyester composition according to claim 3, wherein based on a total weight of the biodegradable polyester composition, the weight content of glycidyl methacrylate is 0.5 ppm-8 ppm.

13. The biodegradable polyester composition according to claim 9, wherein based on a total weight of the biodegradable polyester composition, the weight content of glycidyl methacrylate is 0.5 ppm-8 ppm.

14. The biodegradable polyester composition according to claim 4, wherein based on a total weight of the biodegradable polyester composition, the weight content of glycidyl methacrylate is 0.5 ppm-8 ppm.

15. The biodegradable polyester composition according to claim 10, wherein based on a total weight of the biodegradable polyester composition, the weight content of glycidyl methacrylate is 0.5 ppm-8 ppm.

16. The biodegradable polyester composition according to claim 2, wherein the biodegradable aliphatic-aromatic polyester is selected from one or more of pol(butyleneadipate-co-terephtalate) (PBAT), poly(butylenesuccinate-co-terephthalate) (PBST) and poly(butylenesebacate-co-terephthalate) (PBSeT).

17. The biodegradable polyester composition according to claim 2, wherein the organic filler is selected from one or more of natural starch, plasticized starch, modified starch, natural fiber and wood flour; and the inorganic filler is selected from one or more of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber.

18. The biodegradable polyester composition according to claim 2, wherein it further comprises 0 to 4 parts of at least one of following substances: plasticizer, release agent, surfactant, wax, antistatic agent, pigment, UV absorbent, UV stabilizer and other plastic additives.

* * * * *